(12) United States Patent
Spoerl et al.

(10) Patent No.: US 8,416,516 B2
(45) Date of Patent: Apr. 9, 2013

(54) INSERT FOR HOLDING AN OPTICAL SYSTEM IN A LASER MACHINING HEAD, AND A LASER MACHINING HEAD

(75) Inventors: Georg Spoerl, Rheinstetten (DE); Christian Loose, Gaggenau (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 56 days.

(21) Appl. No.: 12/890,073

(22) Filed: Sep. 24, 2010

(65) Prior Publication Data
US 2011/0075274 A1 Mar. 31, 2011

(30) Foreign Application Priority Data
Sep. 25, 2009 (DE) .................... 20 2009 012 924 U

(51) Int. Cl.
*G02B 7/02* (2006.01)
*G02B 15/14* (2006.01)

(52) U.S. Cl.
USPC ............ 359/814; 359/824; 359/811; 359/694

(58) Field of Classification Search .......... 359/694–704, 359/811–824
See application file for complete search history.

(56) References Cited

U.S. PATENT DOCUMENTS

| 4,443,043 | A | * | 4/1984 | Yamaguchi | 310/90.5 |
| 4,552,417 | A | * | 11/1985 | Yamashita et al. | 310/90.5 |
| 4,717,223 | A | * | 1/1988 | Ishida et al. | 359/200.1 |
| 5,702,622 | A | | 12/1997 | Schubert et al. | 219/121.75 |
| 2003/0019855 | A1 | * | 1/2003 | Schubert | 219/121.75 |
| 2005/0006361 | A1 | * | 1/2005 | Kobayashi et al. | 219/121.73 |
| 2005/0184036 | A1 | | 8/2005 | Hunter et al. | 219/121.69 |
| 2009/0231596 | A1 | * | 9/2009 | Hajmousa | 356/615 |

FOREIGN PATENT DOCUMENTS

| CA | 2251243 | 4/2000 |
| DE | 3208380 | 1/1984 |
| DE | 3814985 | 12/1988 |
| DE | 29507189 U1 | 6/1995 |
| EP | 0469532 | 2/1992 |
| EP | 1643284 | 4/2006 |
| JP | 2009189091 | 8/2009 |
| WO | WO 2004086595 | 10/2004 |

* cited by examiner

Primary Examiner — Mohammed Hasan
(74) Attorney, Agent, or Firm — Muncy, Geissler, Olds & Lowe, PLLC

(57) ABSTRACT

An insert (18) for holding an optical system (90, 92), in particular a focusing optics, in a laser machining head (10) for machining a workpiece with a laser beam. The optical system (90, 92) is displaced in the longitudinal direction of the laser beam relative to the insert (18) via adjusting means. The adjusting means includes a linear adjusting device (64, 66, 68) with a synchronous linear motor (68). The laser machining head (10) has a housing (14) in which the insert (18) can be introduced laterally.

19 Claims, 3 Drawing Sheets

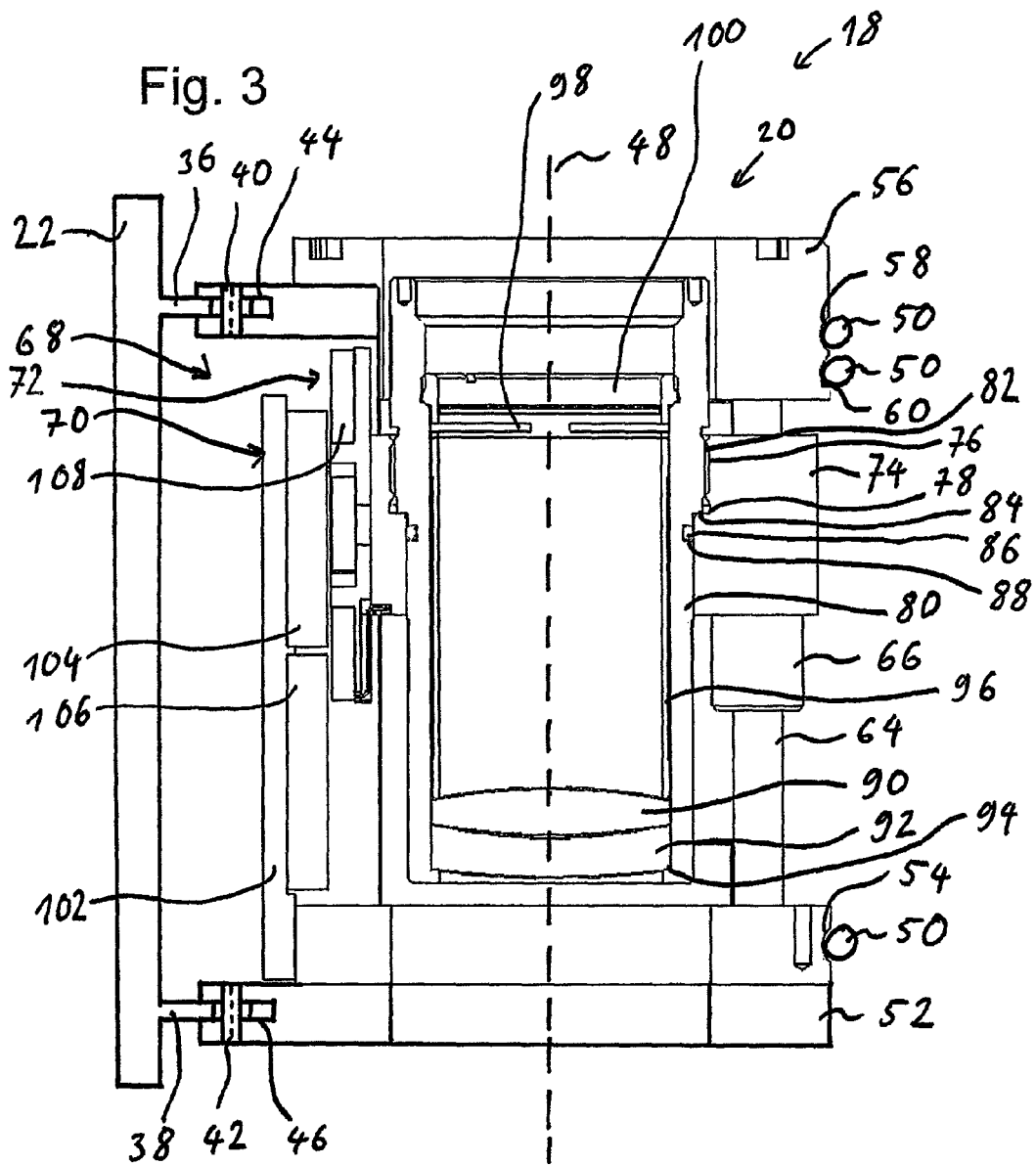

INSERT FOR HOLDING AN OPTICAL SYSTEM IN A LASER MACHINING HEAD, AND A LASER MACHINING HEAD

BACKGROUND OF THE INVENTION

1. Field of the Invention

The invention relates to an insert for holding an optical system, in particular a focusing optics, in a laser machining head, and a laser machining head which comprises such an insert.

2. Description of the Background

In the machining of a workpiece by means of a laser machining head, in particular in laser cutting, it is usual to provide a laser machining head with a housing into which an insert with a focusing optics is inserted, a laser beam running through the laser machining head to a cutting nozzle being focused by an optical system held in the insert such that a workpiece can be machined. The insert with the optical system for focusing the laser beam is designed here such that the optical system can be adjusted relative to the insert, on the one hand the optical system being capable of adjustment in a plane perpendicular to the laser beam, and on the other hand an adjusting device being provided which can be used to set the optical system in the longitudinal direction of the laser beam.

Thus, DE 295 07 189 U1 discloses a terminal head for machining a workpiece by means of a laser beam, which has a housing and an insert, which can be introduced laterally into the housing and has a focusing optics. An adjusting ring can be rotated from outside through a cutout in a front plate of the insert, in order to displace the focusing optics upwards or downwards. When the adjusting ring is being rotated, a horizontal flange is corotated. The horizontal flange has an internal thread which engages with an external thread of an adjusting cylinder. The focusing optics is mounted in the adjusting cylinder. The adjusting cylinder is supported in a rotationally secure fashion by means of a longitudinal slot in the laser beam direction, and can be displaced in an axial direction along the laser beam. When the adjusting ring is being rotated, it takes the adjusting cylinder correspondingly with it via the horizontal flange, and this leads to an axial displacement of the lens holder as a result of the engagement of the threads. Depending on the sense of rotation of the adjusting ring, the lens holder, and with it the focusing optics, are displaced upwards or downwards.

DE 38 14 985 A1 describes a further laser machining tool. Here, a lens is supported in a lens holder such that it can be displaced relative to a nozzle both in an axial and in a radial direction. To this end, the lens holder is pressed from below with the aid of a spring against a sliding frame which can be axially adjusted inside the outer wall with the aid of an adjusting nut. Setscrews in the sliding frame are actuated for the radial adjustment.

Thus, in the case of the known laser machining heads, a focusing optics is adjusted in the longitudinal direction of the laser beam by transforming a rotary movement into an axial movement according to the spindle principle. This conversion of a rotating movement into an axial movement results in a frictional contact between the lens holder provided with an external thread, and the adjusting ring provided with an internal thread, it being possible for this to result in abrasion leading to soiling of the focusing optics. Moreover, to promote sliding contact use is made as a rule of lubricants which can likewise contribute to soiling of the focusing optics.

During operation of the laser machining head, the heating of the focusing optics gives rise to a focal position displacement in the longitudinal direction of the laser beam. This focal position displacement in the laser beam direction must be manually corrected in the case of the known laser machining heads, which means that the operation of the laser machining head has to be interrupted.

BRIEF SUMMARY OF THE INVENTION

It is therefore the object of the invention to provide an insert for holding an optical system, in particular a focusing optics, in a laser machining head, and to provide a laser machining head with such an insert, in the case of which insert and head soiling of the optical system can be reduced and a focal position of the optical system can be set in a simple and rapid way.

According to the invention, an insert is provided for holding an optical system in a laser machining head for machining a workpiece with a laser beam, it being possible to displace the optical system relative to the insert via adjusting means. According to the invention the adjusting means for displacing the optical system in the longitudinal direction of the laser beam comprise a linear adjusting device with a synchronous linear motor, in particular with a synchronous linear motor excited by permanent magnet. Apart from friction on guide elements, which can be minimized, it is possible through the use of a synchronous linear motor for the focusing optics to be displaced in a fashion substantially free from friction. Moreover, a rapid and accurate automatic setting of the position of the focusing optics in the longitudinal direction of the laser beam is possible by means of such a motor.

Thus, the invention provides an insert for a laser machining head which can adjust a focusing lens both in a plane perpendicular to the laser beam direction and in the longitudinal direction of the laser beam, the adjustment in the Z-direction along the laser beam being performed by means of an electric synchronous linear motor. Here, a synchronous linear motor is to be understood as an electric motor in the case of which a constantly magnetized rotor is carried along synchronously by a moving magnetic field in the surrounding stator, with the stator having constant magnetization in the same way, and the rotor being able to have a moving magnet field. Consequently, the linear synchronous motor runs synchronously with the applied magnetic field, that is to say the current applied to a coil. A synchronous linear motor excited by permanent magnet is understood to be a motor in the case of which either the stator or the rotor (actuator) is designed as at least one permanent magnet.

For the use of a laser machining head in cutting or welding processes, it is expedient in this case when the optical system is a focusing optics for focusing the laser beam onto the workpiece to be machined.

In a very simple refinement of the inventive linear adjusting device, the synchronous linear motor excited by permanent magnet is fashioned as a linear direct drive, the synchronous linear motor excited by permanent magnet comprising a stator with two permanent magnets and an actuator with a coil.

In an advanced refinement of the linear adjusting device, the linear motor can also be designed as a stepping motor, in order to form a functional unit the synchronous linear motor excited by permanent magnet advantageously comprising a number N of permanent magnets and a number M of pairs of N/M, N/M being equal to 2/3, 4/3, 10/6 or 14/6.

For the real transformation of the synchronous linear motor excited by permanent magnet, it is expedient when the at least two permanent magnets are arranged next to one another and alternately poled, and the coil axle of the at least one coil is arranged along the poling direction of the at least two permanent magnets.

In order to support the focusing optics in a stable fashion, it is advantageous when the linear adjusting device further has a linear guide which is arranged opposite the synchronous linear motor, a holder for accommodating a lens holder being mounted between the linear guide and synchronous linear motor and being guided in the adjusting direction of the linear guide and the synchronous linear motor. In this case, the linear guide advantageously has a guide rod and a guide bushing in which the guide rod is accommodated in a sliding fashion.

For the purpose of providing support which is as free as possible from abrasion and as low in friction as possible, it is particularly advantageous when the linear guide is designed as a ceramic sliding bearing.

In order to be able to exchange the focusing optics easily, it is expedient when the holder for accommodating the lens holder has a cylindrical cutout with an internal thread, and the lens holder is designed in the form of a cylinder with an external thread, it being possible to screw the lens holder with its external thread into the internal thread of the holder.

In a particularly simple refinement of the invention, the lens holder has a hollow cylindrical cutout with a shoulder section on which the optical system is supported.

The adjusting means of the inventive insert are expediently further designed to displace the optical system perpendicular to the longitudinal direction of the laser beam.

To this end, the inventive insert advantageously further has a front plate and a frame which accommodates the first adjusting device, the frame being supported pivotably on the front plate.

In this case, the frame is advantageously supported in a fixed axial position on the front plate of the insert such that it can pivot about an axle which runs at a spacing parallel to the longitudinal direction of the laser beam.

In this case, this axle can be permanently connected to the frame and guided laterally in a suitable fashion between limbs which project from the rear side of the front plate. Consequently, it is possible, on the one hand, to pivot the frame, and the focusing optics together therewith, about said axle, while on the other hand, however, it is also possible to displace the frame perpendicular to the longitudinal direction of the laser beam, since the axle can also be displaced between said limbs which run parallel to one another and are at a spacing from one another which corresponds to the diameter of the axle.

Furthermore, according to an advantageous development of the invention the frame is drawn against the rear side of the front plate with the aid of springs, it being possible, for example, for the springs to be guided around the frame, and to be fastened with their ends on the rear side of the front plate.

The adjusting means for the plane displacement of the focusing optics can project through the front plate, being able, for example, to be designed as screws. It is preferred to provide two screws which lie at an angle to one another in the plane and are respectively aligned with the centre of the laser beam and accommodate said axle, about which the guide sleeve can pivot, between them.

According to the invention, a laser machining head is further provided for machining a workpiece by means of a laser beam, which has a housing into which the inventive insert can be laterally introduced.

BRIEF DESCRIPTION OF THE DRAWINGS

The invention is described in detail below with reference to the drawing, in which:

FIG. 3 shows a diagrammatic sectional view in longitudinal direction of the optical beam path of the inventive insert from FIG. 2.

DETAILED DESCRIPTION OF THE PREFERRED EMBODIMENTS

Figure 1:
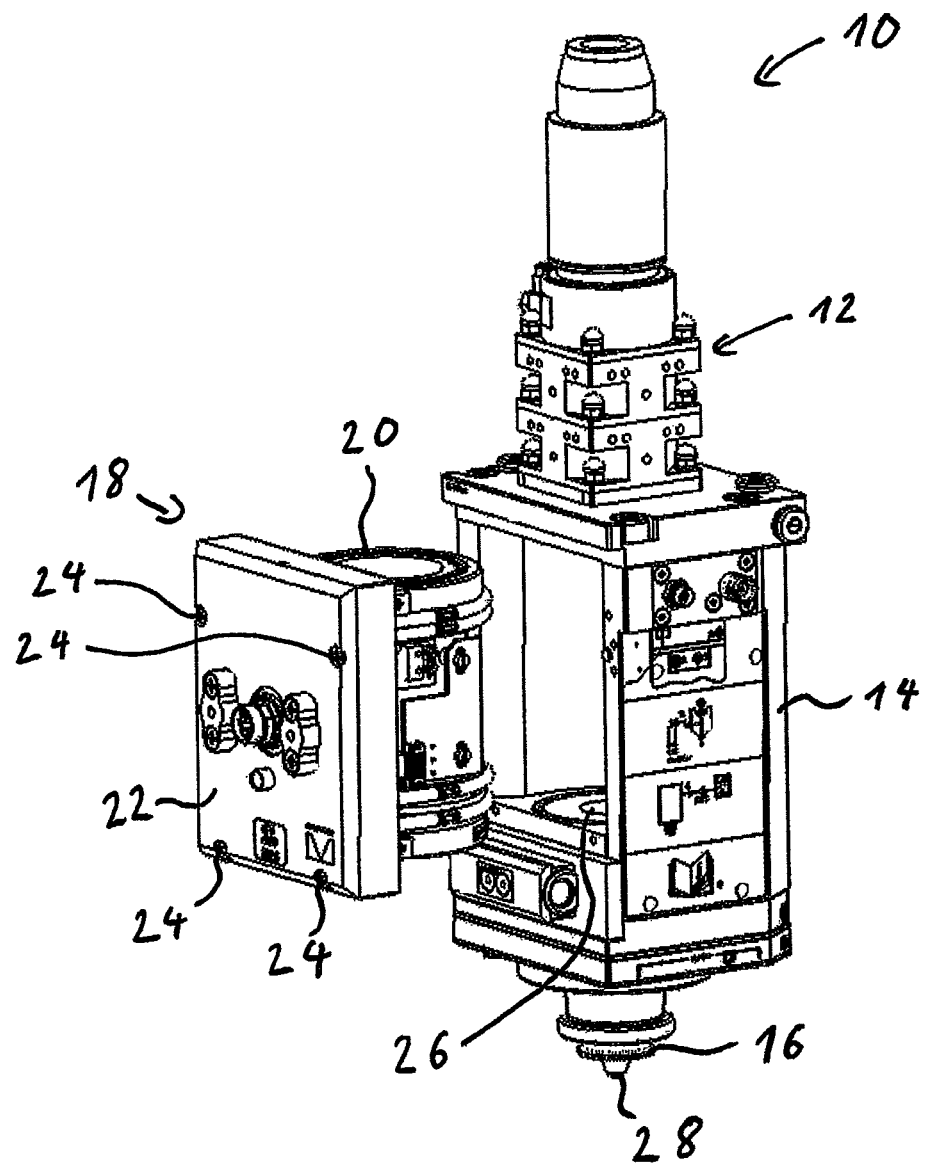
FIG. 1 shows a perspective diagrammatic view of a laser machining head with an inventive insert.

A diagrammatic perspective view of a laser machining head 10 as used with laser machining means or laser machining systems is shown in FIG. 1. Here, a working laser beam (not shown) coming from the laser machining means and which is fed to the laser machining head 10 by means of an optical fibre and is coupled out of the optical fibre by means of a collimator optics 12, is guided through a housing 14 of the laser machining head 10 to a nozzle 16 from which the laser beam exits in order to machine, in particular to cut, a workpiece. Here, the working laser beam is focused for the purpose of machining the workpiece by means of an optical system which is arranged in an insert 18.

The insert 18 has a frame 20 with a hollow cylindrical cutout and a front plate 22, it being possible to adjust the frame 20 and the front plate 22 relative to one another, as is described later in more detail. To operate the laser machining head 10, the frame 20 of the insert 18 is introduced into the housing 14 of the laser machining head 10, and the insert 18 is fastened on the housing 14 by means of fixing screws 24 in the front plate 22. In the inserted state of the insert 18, the cylindrical cutout of the frame 20 is concentric with an optical system of the collimator 12 and with a housing outlet opening 26 of the housing 14 which is connected to a nozzle opening 28 of the nozzle 16.

The aim below is to explain the design of the inventive insert 18 with the aid of FIGS. 2 and 3.

Figure 2:
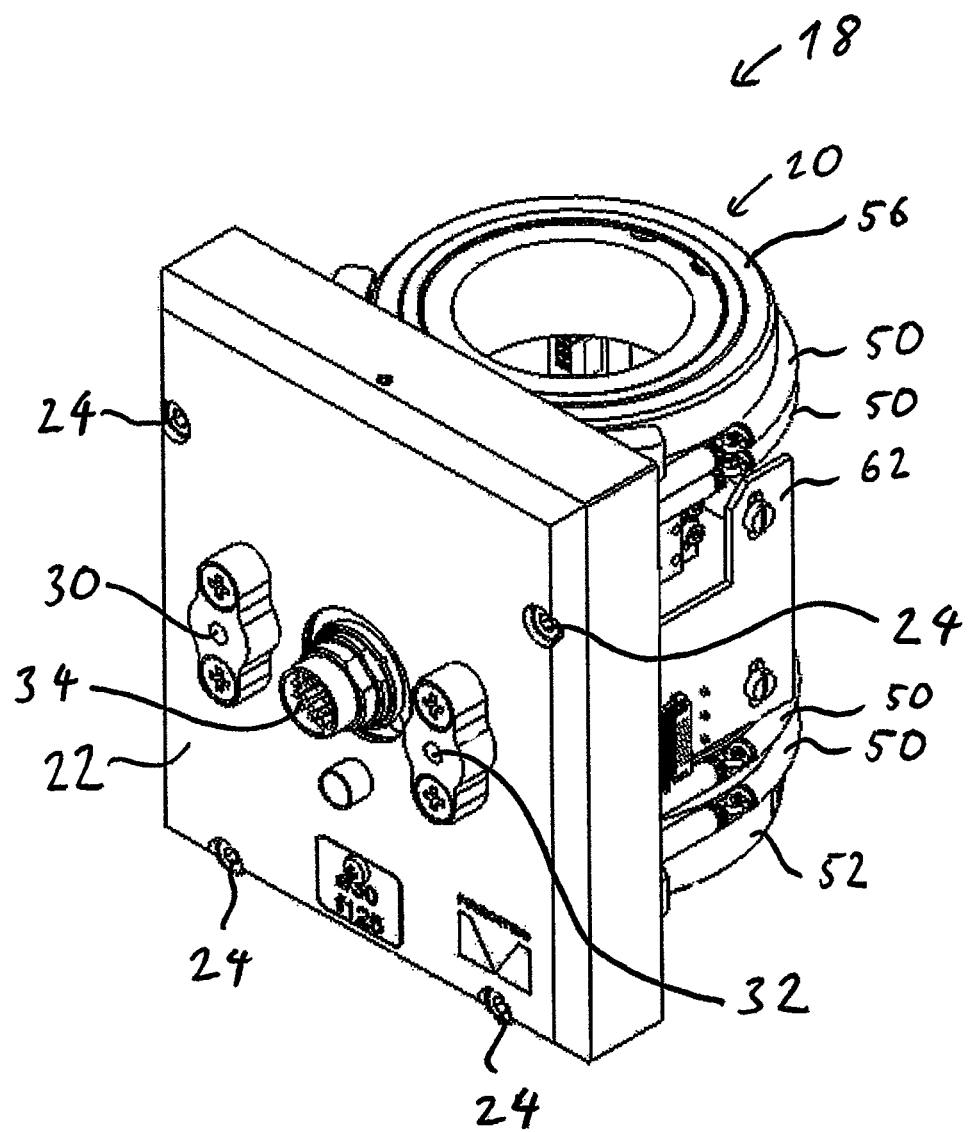
FIG. 2 shows a perspective diagrammatic view of the inventive insert.

As shown in FIG. 2, adjusting screws 30 and 32 which serve to adjust in a plane the focusing optics which are supported by the insert 18 are screwed in the front plate 22. By rotating one or both adjusting screws 30, 32, the focusing optics can be displaced in a plane perpendicular to the longitudinal direction of the laser beam, as is still to be explained. Moreover, a socket 34 is arranged in the front plate 22 in order to enable an electric linear motor explained in more detail later, to be driven electrically, which can be used to adjust the focusing optics in the longitudinal direction of the laser beam.

As shown in FIG. 3, on its rear side the front plate 22 has two lugs 36 and 38 which are spaced apart from one another in the vertical direction and are of substantially U-shaped design and have two limbs which run parallel to one another and whose opening points away from the front plate 22. These lugs 36, 38 can be integrally connected to the front plate 22. One is located at the upper end of the front plate 22, the other at the lower end of the front plate 22. A pin 40, 42 is respectively guided between the two limbs of a respective lug 36, 38. The spacing of the two limbs of a respective lug 36, 38 running parallel to one another, corresponds in this case to the diameter of the pin 40, 42 respectively guided between the limbs. The pins 40, 42 can therefore be displaced between the limbs, but can also rotate, specifically about their longitudinal axis.

The lugs 36, 38 or limbs respectively engage in horizontal slots 44, 46 which are located in a part of the circumferential wall of the frame 20. Passing vertically through these horizontal slots 44, 46 are the pins 40, 42, the pins 40, 42 themselves being permanently inserted into the respective upper and lower edge region of the frame 20. The centre line of the frame 20 is provided in FIG. 3 with the reference numeral 48. This centre line 48 runs in the longitudinal direction of the laser beam, thus indicating that the laser beam should be coaxial with the centre line 48. The pins 40, 42 run parallel to the centre line 48, while the respective limbs of the lugs 36, 38, and also the slots 44, 46, lie in planes respectively perpendicular to the centre line 48. Here, seen in the vertical direction, that is to say in a direction parallel to the centre line 48, the limbs of the lugs 36, 38 are guided without play in the horizontal slots 44, 46. It follows that the frame 20 cannot be displaced in the longitudinal direction of the centre line 48. Rather, the frame 20 can be displaced only in a plane perpendicular to the centre line 48, and/or rotated about the pins 40, 42.

The frame 20 is drawn against the rear wall of the front plate 22 with the aid of springs 50. The springs are in this case laid around the frame 20 and fastened with their ends on the rear wall of the front plate 22 (not shown).

With the aid of the adjusting screws 30, 32 already mentioned, it is now possible to displace the frame 20 in a plane perpendicular to the centre line 48 against the force of the springs 50. In this process, the pins 40, 42 can likewise be displaced in the region between the respective limbs of the lugs 36, 38, or be rotated about their longitudinal axis. The adjusting screws 30, 32 can, for example, be grub screws which are aligned such that they run at an angle of 45 degrees to one another without being substantially aligned with the centre of the frame 20. They strike against the circumferential wall of the frame 20 (not visible in the sectional view in FIG. 3) with their front setting surfaces.

The frame 20 has an annular base 52 with a guide groove 54, on the circumferential side, in which one of the springs 50 is embedded in order to prevent the spring slipping off in the direction of the centre line 48. Arranged opposite the annular base 52 is an annular cover 56 which has two adjacent grooves 58, 60 on the circumferential side, in which two of the springs 50 are guided. As FIG. 2 shows, the annular cover 56 and the annular base 52 are interconnected by laterally arranged support elements 62 such that the corresponding ring axes of the base 52 and the cover 56 coincide, and thus form a cylindrical channel through the frame 20.

On the side of the frame 20 averted from the front plate 22, a guide rod 64 is arranged in the direction of the centre line 48 and is permanently connected with one end to the annular base 52 and with its other end to the annular cover 56. A guide bushing 66 is supported in a sliding fashion on the guide rod 64 such that the guide bushing 66 can be displaced in the direction of the centre line 48 and in the longitudinal direction of the laser beam.

A synchronous linear motor 68 excited by permanent magnet which has a stator 70 connected to the annular base 52 and an actuator 72 arranged adjacent to the stator 70 is arranged on the side of the frame 20 facing the front plate 22. The exact design and the way the synchronous linear motor 68 excited by permanent magnet functions are to be described more accurately further below. The actuator 72 and the guide bushing 66 are both connected to an annular holder 74 in such a way that by operating the synchronous linear motor 68 the annular holder 74 can be moved upwards and downwards along the centre line 48 of the frame 20 in the longitudinal direction of the laser beam by means of the guide of the guide bushing 66.

On its beam input side, the annular holder 74 has an internal thread 76 with a terminal shoulder section 78, a cylindrical lens holder 80 with an external thread 82 being screwed into the annular holder 74, and a shoulder section 84 of the lens holder 80 butting against the corresponding shoulder 78 of the annular holder 74. Furthermore, a sealing ring 86 is arranged between the annular holder 74 and the lens holder 80 in a groove 88, on the circumferential side, of the lens holder 80 such that it seals the contact between the lens holder 80 and the annular holder 76, in order to avoid an escaping of cutting gas, which is guided with the laser beam out of the nozzle 16 (FIG. 1) so as to blow out molten material, and is fed in a lower part of the housing 14 to a channel between the opening 26 and the opening 28.

The lens holder 80 is of hollow cylindrical design and accommodates a focusing optics 90, 92 in its lower part. This focusing optics 90, 92 can comprise one or more lenses and is inserted from below into a correspondingly enlarged opening of the lens holder 80. On the circumferential side, the focusing optics 90, 92 rests on a corresponding shoulder 94 of the lens holder 80. In order to secure the focusing optics 90, 92, a lens sleeve 96 is inserted into the lens holder 80 and is pressed against the focusing optics 90, 92 by means of a spring ring 98, which butts against a threaded ring 100 on the beam entry side of the frame 20, in order to secure the focusing optics 90, 92 in the lens holder 80. The focusing optics 90, 92 can also additionally have spacer rings in order to position lenses.

Owing to the permanent connection between the focusing optics 90, 92, the lens holder 80 and the annular holder 74, the focusing optics 90, 92 can be displaced along the centre line 48 and, with an insert 18 inserted in the laser machining head 10, along the longitudinal direction of the laser beam owing to the guidance by the guide bushing 66, which is supported in a sliding fashion on the guide rod 64. The linear guide 64, 66 composed of the guide rod 64 and guide bushing 66 is, however, not restricted to the arrangement of guide rod 64 and guide bushing 66 shown, and so it is also, for example, possible to provide a plurality of guide rods and guide bushings on the circumferential side of the frame 20 between the annular base 52 and the annular cover 56, in order to enable a stable guidance of the focusing optics 90, 92 in the longitudinal direction of the laser beam. Furthermore, the linear guide 64, 66 is not restricted to the guide rod 64 having a circular cross section: it is also conceivable for the guide rod 64 to have any desired cross section, the guide bushing 66 having a cross section corresponding to the cross section of the guide rod 64 so that said guide bushing accommodates the guide rod 64 and can slide correspondingly on the guide rod 64. The linear guide 64, 66 is preferably made from a material which enables sliding to be as free from abrasion as possible, that is to say ceramic, for example. Here, a sliding bearing made from silicon carbite or silicon nitrite is particularly preferred.

The design of the synchronous linear motor 68 excited by permanent magnet is now to be described in more detail below.

The actuator 72 is guided by the linear guide 64, 66 along the stator 70 such that it always runs along the stator 70 without touching it at a slight spacing. The stator 70 has an iron core 102 which is connected to the annular base 52. A first magnet 104 and a second magnet 106 are arranged adjacent to one another in the direction of the centre line 48 on the iron core 102. The poling direction of the first magnet 104 and the second magnet 106 runs perpendicular to the centre line 48 in the direction of the front plate 22, the first magnet 104 and the second magnet 106 being differently poled. The actuator 72 has a coil 108 which is arranged opposite the first magnet 104 and the second magnet 106 and overlaps both magnets 104, 106. The coil axle of the coil 108 runs in the poling direction of the permanent magnets 104, 106. Depending on an applied current which flows through the coil 108, a force is produced either in the one or in the other direction along the centre line 48 such that the focusing optics 90, 92 can be moved correspondingly in the longitudinal direction of the laser beam. Given this very simple linear direct drive, which consists only of two permanent magnets 104, 106 and a coil 108, it is possible in addition to provide a position measurement device (not shown) which determines the position in a longitudinal direction of the centre line 48 of the annular holder 74 in order thereby to enable the position of the focusing optics 90, 92 to be accurately set.

In addition to the exemplary embodiment, shown in FIG. 3, of the insert 18 with the synchronous linear motor 68 which is excited by permanent magnet and consists of two permanent magnets 104, 106 and a coil 108, it is, however, also possible to provide a synchronous linear motor which is excited by permanent magnet and comprises a number N of permanent magnets and a number M of coils as pairs of N/M, N/M being equal to 2/3, 4/3, 10/6 or 14/6. The complete motor can be considered here as a sequence of elementary machines of which each forms per se a functional unit with N permanent magnets and M coils. By applying different currents to the corresponding coils, it is possible to implement a linear stepping motor in a way similar to a stepping torque motor, it thereby being possible to move the focusing optics 90, 92 accurately and quickly to a predetermined position along the centre line 48 and, with the insert 18 inserted in the laser machining head 10, to move said focusing optics in the longitudinal direction of the laser beam. When use is made of a plurality of permanent magnets and a plurality of coils, the juxtaposed permanent magnets are poled in an alternating fashion, and the coil axle of the at least one coil is arranged along the poling direction of the permanent magnets.

Owing to the contactless drive of the linear motor 68, it is possible to achieve a virtually abrasion free adjustment of the focusing optics 90, 92 by selecting appropriate sliding bearings 64, 66, the result being to reduce soiling of the focusing optics 90, 92. Moreover, the use of the synchronous linear motor 68 excited by permanent magnet has the advantage that it is possible to dispense with a spindle drive, as a result of which no soiling of the focusing optics 90, 92 results from the lubricants used.

The dimensions of the inventive insert are, moreover, fashioned such that said insert can replace an insert known from the prior art, in the case of which the adjustment in the longitudinal direction of the laser beam is performed manually by an adjusting ring, and so it is easily possible to upgrade from a known insert to the inventive insert 18 which fits the laser machining head 10.

Thus, according to the invention an insert 18 is proposed for holding an optical system 90, 92 in a laser machining head 10 by means of which insert a focusing optics 90, 92 can easily be adjusted in the longitudinal direction of the laser beam in a fashion which is virtually free from abrasion, quick and accurate, as a result of which it is possible, on the one hand, to avoid soiling of the optical system and, on the other hand, to achieve a simple and automatic correction of the focal position of the focusing optics 90, 92 upon heating of the focusing optics 90, 92.

What is claimed is:

1. An insert in a laser machining head for machining a workpiece with a laser beam, the insert comprising:
an optical system held in the insert;
an adjusting means for displacing the optical system relative to the insert in the longitudinal direction of the laser beam;
the adjusting means including a linear adjusting device with a synchronous linear motor having a contactless drive.

2. The insert according to claim 1, wherein the optical system is a focusing optics for focusing the laser beam onto the workpiece to be machined.

3. The insert according to claim 1, wherein the adjusting means is designed to displace the optical system perpendicular to the longitudinal direction of the laser beam.

4. The insert according to claim 3, further having a front plate and a frame which accommodates the linear adjusting device, the frame being supported pivotably on the front plate.

5. The insert according to claim 4, wherein the frame is supported in a fixed axial position on the front plate of the insert such that it can pivot about an axle which runs at a spacing parallel to the longitudinal direction of the laser beam.

6. The insert according to claim 5, wherein the axle is permanently connected to the frame and is guided laterally in a suitable fashion between limbs which project from the rear side of the front plate.

7. The insert according to claim 6, wherein the frame is drawn against the rear side of the front plate with the aid of springs.

8. The insert according to claim 7, wherein the springs are guided around the frame and are fastened with their ends on the rear side of the front plate.

9. The insert according to claim 4, wherein the adjusting means for a plane displacement of the optical system is formed as screws which penetrate the front plate, lie in the plane at an angle to one another and accommodate the axles between them.

10. Laser machining head for machining a workpiece by means of a laser beam, having a housing in which the insert according to claim 1 can be introduced laterally.

11. An insert in a laser machining head for machining a workpiece with a laser beam, the insert comprising:
an optical system held in the insert;
an adjusting means for displacing the optical system relative to the insert in the longitudinal direction of the laser beam;
the adjusting means including a linear adjusting device with a synchronous linear motor;
wherein the synchronous linear motor is a synchronous linear motor excited by permanent magnet which comprises a stator with two permanent magnets and an actuator with a coil.

12. The insert according to claim 1, wherein the synchronous linear motor is a synchronous linear motor excited by permanent magnet and comprises a number N of permanent magnets and a number M of coils as pairs of N/M, N/M being equal to 2/3, 4/3, 10/6 or 14/6.

13. The insert according to claim 12, wherein the synchronous linear motor excited by permanent magnet is a linear stepping motor.

14. The insert according to claim 11, wherein the two permanent magnets are arranged next to one another and alternately poled, and the coil axle of the coil is arranged along the poling direction of the at least two permanent magnets.

15. An insert in a laser machining head for machining a workpiece with a laser beam, the insert comprising:
an optical system held in the insert;
an adjusting means for displacing the optical system relative to the insert in the longitudinal direction of the laser beam;

the adjusting means including a linear adjusting device with a synchronous linear motor;

wherein the linear adjusting device has a linear guide which is arranged opposite the synchronous linear motor, a holder for accommodating a lens holder being mounted between the linear guide and synchronous linear motor and being guided in the adjusting direction of the linear guide and the synchronous linear motor.

16. The insert according to claim 15, wherein the linear guide has a guide rod and a guide bushing in which the guide rod is accommodated in a sliding fashion.

17. The insert according to claim 16, wherein the linear guide is designed as a ceramic sliding bearing.

18. The insert according to claim 15, wherein the holder for accommodating the lens holder has a cylindrical cutout with an internal thread, and the lens holder is designed in the form of a cylinder with an external thread, it being possible to screw the lens holder with its external thread into the internal thread of the holder.

19. The insert according to claim 18, wherein the lens holder has a hollow cylindrical cutout with a shoulder section on which the optical system is supported.

* * * * *